(12) United States Patent
Jung et al.

(10) Patent No.: US 8,842,731 B2
(45) Date of Patent: Sep. 23, 2014

(54) CODING AND DECODING OF AN IMAGE OR OF A SEQUENCE OF IMAGES SLICED INTO PARTITIONS OF PIXELS OF LINEAR FORM

(75) Inventors: Joël Jung, Le Mesnil Saint-Denis (FR); Guillaume Laroche, Rennes (FR)

(73) Assignee: Orange, Paris (FR)

( * ) Notice: Subject to any disclaimer, the term of this patent is extended or adjusted under 35 U.S.C. 154(b) by 317 days.

(21) Appl. No.: 12/937,291

(22) PCT Filed: Apr. 6, 2009

(86) PCT No.: PCT/FR2009/050584
§ 371 (c)(1),
(2), (4) Date: Oct. 11, 2010

(87) PCT Pub. No.: WO2009/136051
PCT Pub. Date: Nov. 12, 2009

(65) Prior Publication Data
US 2011/0026594 A1    Feb. 3, 2011

(30) Foreign Application Priority Data
Apr. 15, 2008  (FR) ...................................... 08 52532

(51) Int. Cl.
| | |
|---|---|
| H04N 11/02 | (2006.01) |
| H04N 11/04 | (2006.01) |
| H04N 19/189 | (2014.01) |
| H04N 19/176 | (2014.01) |
| H04N 19/102 | (2014.01) |
| H04N 19/136 | (2014.01) |
| H04N 19/593 | (2014.01) |
| H04N 19/103 | (2014.01) |

(52) U.S. Cl.
CPC ............. *H04N 7/34* (2013.01); *H04N 7/26313* (2013.01); *H04N 7/26244* (2013.01); *H04N 7/26015* (2013.01); *H04N 7/26127* (2013.01); *H04N 7/26026* (2013.01)
USPC .................................. 375/240.12; 375/240.24

(58) Field of Classification Search
None
See application file for complete search history.

(56) References Cited

U.S. PATENT DOCUMENTS 6,075,899 A *    6/2000  Yoshioka et al. ............. 382/233
2001/0019634 A1*    9/2001  Lainema et al. .............. 382/268

(Continued)

FOREIGN PATENT DOCUMENTS

WO    2008/088140 A1    7/2008

OTHER PUBLICATIONS

ThomasWiegand, Overview of the H.264/AVC Video Coding Standard, Jul. 7, 2003, IEEE Transactions on Circuits and Systems for Video Technology, vol. 13, pp. 1-17.*

(Continued)

*Primary Examiner* — Joseph Ustaris
*Assistant Examiner* — Zhubing Ren
(74) *Attorney, Agent, or Firm* — Drinker Biddle & Reath LLP (57) ABSTRACT

A method is provided of coding an image or a sequence of images generating a stream of data comprising data representative of at least one group of pixels in one of said images. Such a method comprises the steps of: selecting, for a group of pixels to be coded, an initial partition of predetermined linear form, slicing said group of pixels to be coded according to said selected initial partition, propagating said initial partition selected in said group of pixels to be coded, until the latter is sliced in its entirety into a plurality of partitions of predetermined form, selecting, for said sliced group of pixels, a predetermined order of traversal of said partitions, predicting and coding said partitions one after the other, according to said selected order of traversal.

19 Claims, 4 Drawing Sheets

(56) References Cited

U.S. PATENT DOCUMENTS

| | | | |
|---|---|---|---|
| 2006/0182181 A1* | 8/2006 | Lee et al. | 375/240.24 |
| 2007/0025626 A1* | 2/2007 | Birinov et al. | 382/238 |
| 2008/0107175 A1* | 5/2008 | Han et al. | 375/240.12 |
| 2008/0123904 A1* | 5/2008 | Sakamoto et al. | 382/107 |
| 2008/0175317 A1* | 7/2008 | Han et al. | 375/240.12 |
| 2009/0028248 A1* | 1/2009 | Kitahara et al. | 375/240.26 |
| 2009/0060045 A1* | 3/2009 | Tateno | 375/240.16 |
| 2009/0225845 A1* | 9/2009 | Veremeev et al. | 375/240.16 |
| 2009/0238260 A1* | 9/2009 | Okamura et al. | 375/240.01 |
| 2009/0238276 A1* | 9/2009 | Har-Noy et al. | 375/240.13 |
| 2009/0268810 A1* | 10/2009 | Dai | 375/240.12 |

OTHER PUBLICATIONS

Sohn et al., "One Dimensional Transform for H.264 Based Intra Coding," 26 Picture Coding Symposium, Lisbon, Portugal, pp. 1-4 (Nov. 7, 2007).

* cited by examiner

| PARTITION | 01 | 02 | 03 |
|---|---|---|---|
| -P1- | 1 | 2 | 5 |
| -P2- | 2 | 1 | 3 |
| -P3- | 3 | 4 | 6 |
| -P4- | 4 | 3 | 2 |
| -P5- | 5 | 6 | 7 |
| -P6- | 6 | 5 | 4 |
| -P7- | 7 | 8 | 8 |
| -P8- | 8 | 7 | 1 |

CODING AND DECODING OF AN IMAGE OR OF A SEQUENCE OF IMAGES SLICED INTO PARTITIONS OF PIXELS OF LINEAR FORM

CROSS-REFERENCE TO RELATED APPLICATIONS

This application is the U.S. national phase of the International Patent Application No. PCT/FR2009/050584 filed Apr. 6, 2009, which claims the benefit of French Application No. 08 52532 filed Apr. 15, 2008, the entire content of which is incorporated herein by reference.

BACKGROUND

The present invention pertains in a general manner to the field of image processing, and more precisely to the coding and to the decoding of digital images and of sequences of digital images.

Digital images and sequences of digital images are known to occupy a great deal of memory space, thus making it necessary, when these images are transmitted, to compress them so as to avoid problems of crowding on the communication network used for this transmission, the throughput usable thereon generally being limited.

The H.264/MPEG-4 AVC standard (AVC standing for "Advanced Video Coding"), such as presented in the document ISO/IEC 14496-10, describes in particular a technique according to which groups of pixels, called macroblocks, of a current image are predicted spatially with respect to other macroblocks belonging to the same image. This is what is called Intra coding (or "Intra-frame-coding"). After this predictive coding, the blocks of pixels are transformed, by a transformation of discrete cosine transform type, and then quantized. The coefficients of the quantized blocks of pixels are thereafter traversed in an order of reading making it possible to utilize the significant number of zero coefficients in the high frequencies, and are then coded by an entropy coding.

More precisely, during the predictive coding of a macroblock in accordance with the aforementioned standard, with the exception of a macroblock of 16×16 type, the macroblock is partitioned into blocks of smaller size, whose form is rectangular or square. The spatial prediction of such a macroblock in an image consists in predicting each block of smaller size forming this macroblock with respect to one or more blocks of another macroblock of this same image. This prediction is possible only if this other macroblock is a macroblock which neighbors the macroblock to be predicted and lies in certain directions which are predetermined with respect to it, that is to say generally above and to the left, in a so-called "causal" neighborhood.

Thus for example, in the case of a macroblock of 16×16 type, the prediction of the pixels which are situated at the bottom, to the right of this macroblock, is necessarily performed with respect to reference pixels which are situated above and to the left of the macroblock. Such reference pixels are very distant spatially from the pixels to be predicted.

The accuracy of such a type of prediction is therefore not optimized, especially in the case of macroblocks having high spatial activity, that is to say in the case where the image to be coded exhibits numerous details.

The present invention is aimed at solving the drawbacks of the prior art by providing methods and devices for coding and decoding images, in which the prediction distance between the pixels to be predicted and the reference pixels is minimized.

SUMMARY

To this end, the invention proposes a method for coding an image or a sequence of images generating a data stream comprising data representative of at least one group of pixels in one of the images, characterized in that it comprises the steps of:

selecting, for a group of pixels to be coded, an initial partition of predetermined linear form, splitting the group of pixels to be coded according to the selected initial partition, propagating the initial partition selected in the group of pixels to be coded, until said group is split in its entirety into a plurality of partitions of predetermined form, selecting, for the split group of pixels, a predetermined order of traversal of the partitions, predicting and coding the partitions one after the other, according to the selected order of traversal.

By virtue, on the one hand, of such a macroblock splitting by propagating a partition of specific form, different from the customary square or rectangular form, and, on the other hand, of a particular order of traversal of the partitions of the macroblock, the Intra coding thus obtained according to the invention is rendered much finer than conventional Intra codings, given that the prediction is performed with reference pixels which are closer.

Furthermore, the fact that the partitions are not square or rectangular allows better adaptation of the coding to particular structures or patterns of the image.

Finally, the fact that the order of traversal of the partitions is different with respect to the conventional order of traversal allows the creation of new partitions of different form and size. Such partitions present the advantage of being able to use reference pixels arising from several partitions already coded, and then decoded.

According to an advantageous characteristic, the prediction and coding of a current partition in the group of pixels are performed with respect to at least one reference partition, the latter being a partition which was propagated before the current partition and which has already been coded, and then decoded.

Such a provision thus makes it possible to reduce in a satisfactory manner the prediction distance between the pixels to be predicted and the reference pixels.

According to other advantageous characteristics:

the selected order of traversal of the partitions is the same as the order in which they were propagated: such an embodiment makes it possible:
  to systematically predict the pixels of a current partition to be predicted with respect to the pixels of an immediately neighboring reference partition;
  to apply, for each partition, a frequency transform that is more localized, and therefore better adapted to the content of the partition;

the selected order of traversal of the partitions allows the prediction and coding of at least one current partition with respect to two reference partitions which immediately neighbor it: such an embodiment thus makes it possible to refine the accuracy of the prediction;

the selected order of traversal of the partitions is of dichotomic type: such an embodiment thus makes it possible to yet further refine the accuracy of the prediction.

According to yet another advantageous characteristic, the data stream comprises information relating to the form of the selected partition and to the order of traversal which was selected.

Thus the decoder is capable of deducing in a deterministic way, for a current macroblock to be decoded, the form of the partition to be propagated and the order in which it will decode the partitions of such a macroblock.

The invention also relates to a method for decoding a data stream representative of an image or of a sequence of images, such a stream comprising data representative of at least one group of pixels in one of the images, characterized in that it comprises the steps of:

determining, in the stream to be decoded, an initial partition of predetermined linear form, splitting the group of pixels to be decoded according to the determined initial partition, propagating the initial partition determined in the group of pixels to be decoded, until said group is split in its entirety into a plurality of partitions of predetermined form, determining, in the stream to be decoded, an order of traversal of the partitions, decoding the partitions one after the other, according to the determined order of traversal.

According to other advantageous characteristics:

the decoding of a current partition in the group of pixels is performed with respect to at least one reference partition, the reference partition being a partition which was propagated previously to the current partition and which has already been decoded;

the order of traversal of the partitions is the same as the order in which they were propagated;

the order of traversal of the partitions allows the decoding of at least one current partition with respect to two reference partitions which immediately neighbor it;

the order of traversal of the partitions is of dichotomic type.

The invention also relates to a carrier signal bearing a data stream representative of an image or of a sequence of images, the stream comprising data representative of at least one group of pixels in one of the images, characterized in that:

some of the representative data relate to a predetermined linear form of an initial partition which was selected at the moment of the prediction and coding of the group of pixels, and some others of the representative data relate to an order of traversal of the partitions forming said group of pixels and resulting from the propagation of the selected initial partition, with a view to the prediction and coding of the partitions.

The invention further relates to a device for coding an image or a sequence of images generating a data stream comprising data representative of at least one group of pixels in one of the images, characterized in that it comprises:

means for selecting, for a group of pixels to be coded, an initial partition of predetermined linear form, means for splitting the group of pixels to be coded according to the selected initial partition, means for propagating the initial partition selected in the group of pixels to be coded, until said group is split in its entirety into a plurality of partitions of predetermined form, means for selecting, for the split group of pixels, a predetermined order of traversal of the partitions, means for predicting and coding the partitions one after the other, according to the selected order of traversal.

The invention also relates to a device for decoding a data stream representative of an image or of a sequence of images, the stream comprising data representative of at least one group of pixels in one of the images, characterized in that it comprises:

means for determining, in the stream to be decoded, an initial partition of predetermined linear form, means for splitting the group of pixels to be decoded according to the determined initial partition, means for propagating the initial partition determined in the group of pixels to be decoded, until said group is split in its entirety into a plurality of partitions of predetermined form, means for determining, in the stream to be decoded, an order of traversal of the partitions, means for decoding the partitions one after the other, according to the determined order of traversal.

The invention further relates to a computer program comprising instructions for implementing one of the methods according to the invention, when it is executed on a computer.

BRIEF DESCRIPTION OF THE DRAWINGS

Other characteristics and advantages will become apparent on reading preferred embodiments described with reference to the figures in which.

DETAILED DESCRIPTION

An embodiment of the invention will now be described, in which the coding method according to the invention is used to code a sequence of images according to a binary stream close to that obtained by coding according to the H.264/MPEG-4 AVC standard. In this embodiment, the coding method according to the invention is for example implemented in a software or hardware manner by modifications of a coder initially in accordance with the H.264/MPEG-4 AVC standard. The coding method according to the invention is represented in the form of an algorithm comprising steps C1 to C6, represented in FIG. 1.

It should be noted that the decoding method according to the invention is symmetrically implemented in a software or hardware manner by modifications of a decoder initially in accordance with the H.264/MPEG-4 AVC standard.

Figure 2:
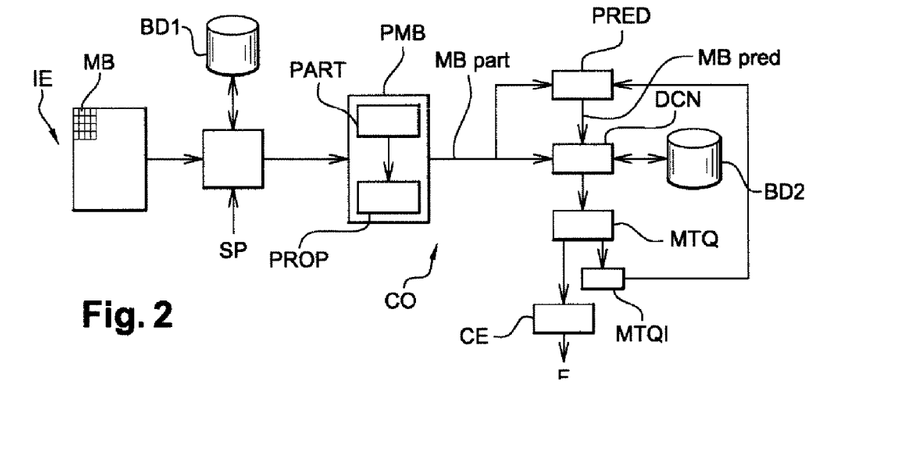
FIG. 2 represents an embodiment of a coding device according to the invention.

According to the embodiment of the invention, the coding method according to the invention is implemented in a coding device CO represented in FIG. 2. The coding performed by the coder CO is of Intra type.

Figure 1:
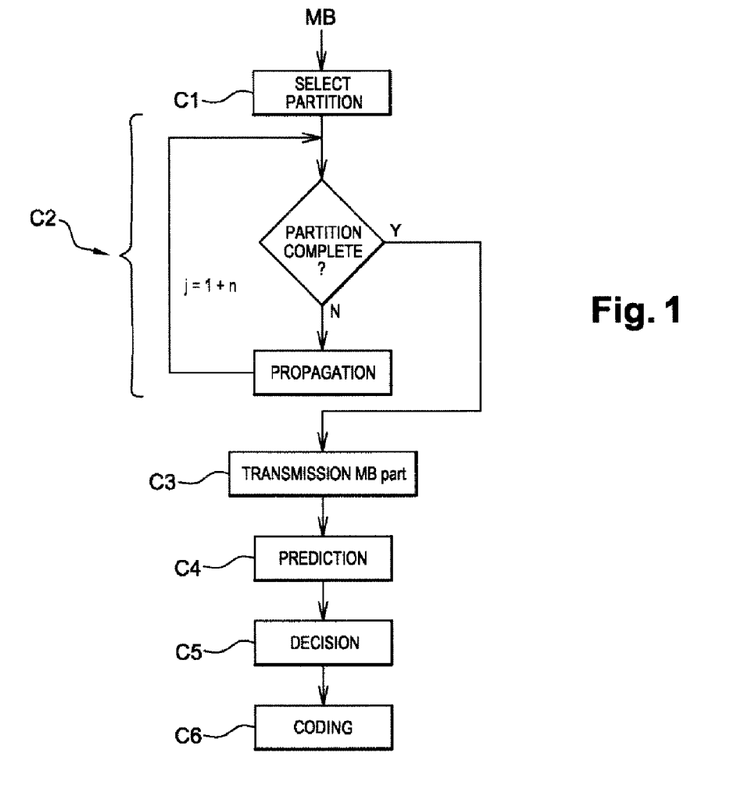
FIG. 1 represents steps of the coding method according to the invention.

The first step C1, represented in FIG. 1, is the selection, for a group of pixels or macroblock belonging to an image IE of the sequence of images to be coded, of a particular partition chosen in a predetermined set of partitions of predetermined linear form. For this purpose, a macroblock MB belonging to the image IE, for example of size 8×8, is applied as input to a partitions selection module SP, represented in FIG. 2.

This module SP for selecting partitions uses for example a procedure for choosing based on exhaustive competition or else a procedure for choosing with the aid of an algorithm with a-priori. Such procedures are well known to the person skilled in the art (cf: G. J. Sullivan and T. Wiegand, "Rate-distortion optimization for video compression," *IEEE Signal Proc. Mag.*, pp. 74-90, 1998). They will not therefore be described further.

Said partitions are grouped together in a database BD1 of the coder CO. They are characterized by the fact that they have linear forms, which distinguish them markedly from the square or rectangular partitions customarily used in the prior art coding techniques.

Various partitions of a macroblock, for example of size 8×8, liable to be selected by the selection module SP, are represented by way of nonlimiting examples in FIG. 3.

Figure 3A:
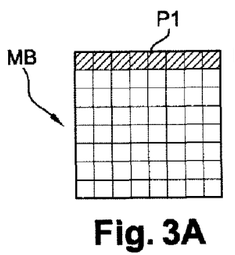
FIG. 3 represents various linear forms of partitions liable to be selected in the coding device according to the invention.

FIG. 3A represents a macroblock MB split according to an initial partition P1 having the form of a row.

Figure 3B:
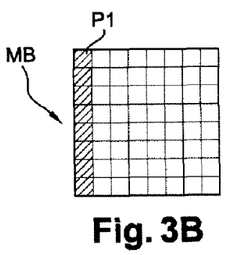

FIG. 3B represents a macroblock MB split according to an initial partition P1 having the form of a column.

Figure 3C:
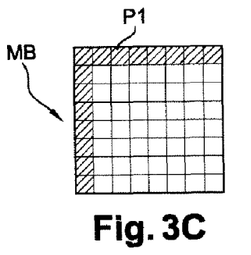

FIG. 3C represents a macroblock MB split according to an initial partition P1 having the form of an L.

Figure 3D:
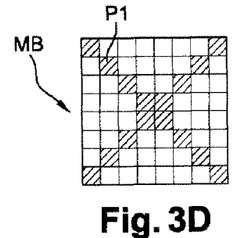

FIG. 3D represents a macroblock MB split according to an initial partition P1 having the form of a cross.

Figure 3E:
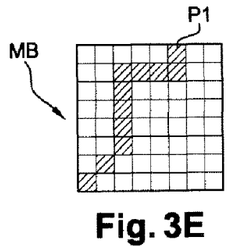

FIG. 3E represents a macroblock MB split according to an initial partition P1 having the form of a broken line containing vertical, horizontal and diagonal segments.

Figure 3F:
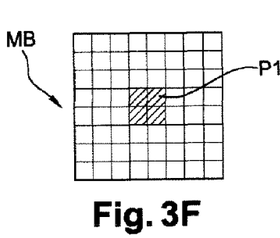

FIG. 3F represents a macroblock MB split according to an initial partition P1 having the form of a broken line whose two ends join up so as to form a point. A broken line such as this is for example determined by the gradient of a macroblock situated in the same position in a previous image (colocated).

The following step C2 represented in FIG. 1 is the partitioning of the macroblock MB, according to the initial partition P1 chosen. This partitioning is performed by a macroblock partitioning module PMB represented in FIG. 2. For this purpose, the partitioning module PMB comprises a splitting sub-module PART intended to split a first time the macroblock MB according to the initial prediction P1 selected, as is represented in FIG. 3.

With reference to FIG. 2, the partitioning module PMB furthermore comprises a propagation sub-module PROP intended to propagate said selected initial partition P1 a number n of times (n being an integer) in the macroblock MB, until the latter is split in its entirety into a number n+1 of partitions of predetermined form.

The propagation module PMB uses a propagation algorithm which uses for example a mathematical morphology operator, such as for example a dilation well known to the person skilled in the art. Such a dilation is described in particular in the work: "Fundamentals of Digital Image Processing", A. K. Jain, published by Prentice Hall.

Such an algorithm thus advantageously allows a macroblock to be partitioned in a deterministic manner, whatever the form of the initial partition.

According to a variant of the invention, the propagation algorithm could use a calculation function for minimizing the prediction distance between a current partition Pj to be predicted ($1 \leq j \leq n+1$) and at least the previous partition Pj−1, once the latter has been coded and then decoded.

FIG. 4 represents the macroblocks MBpart which were obtained after splitting according to the initial partitions P1 represented in FIG. 3.

As may be noted, the propagation algorithm according to the invention is designed in such a way that the partitions P1, . . . , Pn+1 thus obtained:

have the same form or substantially the same form as the initial partition P1,
do not overlap in the macroblock MBpart,
and do not necessarily have the same number of pixels.

Figure 4A:
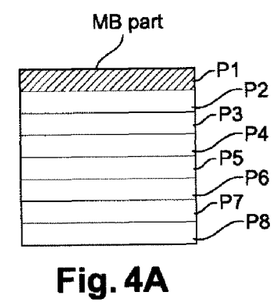
FIG. 4 represents macroblocks partitioned by propagating the various initial partitions represented in FIG. 3.

FIG. 4A represents a partitioned macroblock MBpart comprising eight partitions P1, . . . , P8, all having the form of a row and the same number of pixels.

Figure 4B:
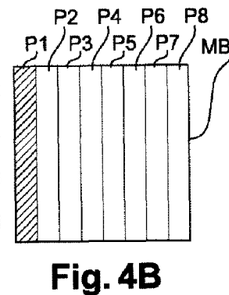

FIG. 4B represents a partitioned macroblock MBpart comprising eight partitions P1 . . . P8, all having the form of a column and the same number of pixels.

Figure 4C:
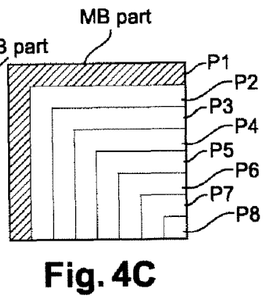

FIG. 4C represents a partitioned macroblock MBpart comprising eight partitions P1 . . . P8, all having the form of an "L", except the last partition P8, but each a different number of pixels.

Figures 4D, 4E:
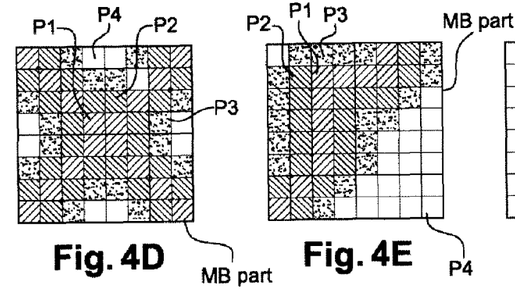

FIG. 4D represents a partitioned macroblock MBpart comprising four partitions P1 . . . P4, almost all having the form of a cross but a different number of pixels.

FIG. 4E represents a partitioned macroblock MBpart comprising four partitions P1 . . . P4, almost all having the form of a broken line containing vertical, horizontal and diagonal segments, but each a different number of pixels.

Figure 4F:
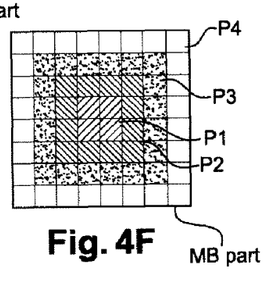

FIG. 4F represents a partitioned macroblock MBpart comprising four partitions P1 . . . P4, all having the form of a broken line whose two ends join up, but each a different number of pixels.

Following the partitioning step C2, in the course of a step C3 represented in FIG. 1, the partitioning module PMB transmits the macroblock MBpart which has just been partitioned to a prediction calculation module PRED represented in FIG. 2.

In the course of a step C4 represented in FIG. 1, the prediction calculation module PRED calculates various possible predictions of the partitioned macroblock MBpart received. Having regard to the fact that the coder CO is of Intra type, the prediction calculation module PRED calculates the possible spatial predictions of each partition P1, . . . , Pn+1 of the macroblock MBpart, with respect to the last partition previously coded and then decoded.

In a particularly advantageous manner, the prediction calculation module PRED predicts the partitions of the macroblock MBpart one after the other, a current partition to be predicted being predicted with reference to the partition which immediately precedes it and which has been coded and then decoded, so as to serve as reference partition.

Thus, the prediction distance is minimized, since the prediction of a partition is done with respect to reference pixels situated in proximity to the pixels of said partition to be predicted.

With reference to FIG. 2, such a reference partition is coded in accordance with the H.264/MPEG-4 AVC standard, that is to say it undergoes, in a manner known per se:

a coding by discrete cosine transform and quantization which is performed by a transform and quantization module MTQ, and then a decoding by inverse discrete cosine transform and inverse quantization, which is performed by the inverse transform and quantization module MTQI.

In the embodiment described, three types of spatial predictions are envisaged which correspond respectively to three different orders of traversal O1, O2, O3 of the partitions, in which the prediction calculation module PRED has the possibility of predicting the partitions P1, ..., Pn+1 of a partitioned macroblock MBpart.

For one and the same form of initial partition P1 selected, three macroblocks MBpred, which have been predicted in accordance with the three aforementioned orders of traversal, are illustrated with reference to FIG. 5.

In the example represented in FIG. 5, it is assumed that each partitioned macroblock MBpart to be predicted is that of FIG. 4A, that is to say split up into eight partitions P1, ..., P8 having the form of rows. Of course, however, the partitions having the other forms represented in FIGS. 4B to 4F are also suitable for being predicted in accordance with the three orders of traversal O1, O2, O3 which will be described.

Figures 5A, 5B, 5C:
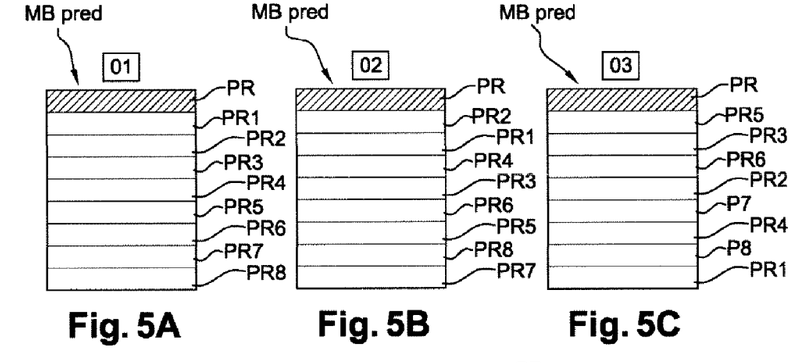
FIG. 5 represents the partitioned macroblock of FIG. 4A, which has been predicted according to three possible orders of traversal.

With reference to FIG. 5A, the partitions P1, ..., P8 of the macroblock MBpart are predicted one after the other, in the order in which they were propagated in FIG. 4A.

More precisely, the prediction calculation module PRED of FIG. 2 traverses from left to right a first row of the macroblock MBpart, so as to predict the first partition P1, termed the initial partition. The first prediction row chosen corresponds to the first row of the macroblock MBpart. The prediction calculation module PRED predicts said partition P1 with reference to the pixels of the reference partition PR of a neighboring macroblock (not represented), which has just been coded, and then decoded, as explained previously. The prediction calculation module PRED delivers a first predicted partition which is immediately coded by the transform and quantization module MTQ, and then decoded by the module by the inverse transform and quantization module MTQI. On completion of these operations, a reference partition PR1 is obtained, as represented in FIG. 5A.

The prediction calculation module PRED thereafter traverses from left to right a second row of the macroblock MBpart. The second row chosen is the second row of the macroblock MBpart. The prediction calculation module PRED chooses to assign this second row to the prediction of the second partition P2 of the macroblock MBpart. The prediction calculation module PRED predicts said partition P2 with reference to the pixels of the partition PR1 which has just been coded, and then decoded, as explained above. The prediction calculation module PRED delivers a second predicted partition which is immediately coded by the transform and quantization module MTQ, and then decoded by the inverse transform and quantization module MTQI. On completion of these operations, a reference partition PR2 is obtained, as represented in FIG. 5A.

The prediction calculation module PRED proceeds in the manner described above for the partitions P3, P4, P5, P6, P7, and then P8 of the macroblock MBpart of FIG. 4A. On completion of this prediction and with reference to FIG. 5A, a predicted macroblock MBpred is obtained, the predicted partitions PR1, PR2, ..., PR8 following one another in the predicted macroblock MBpred, in the order in which the associated partitions P1, P2, ..., P8 had been propagated.

With reference now to FIG. 5B, the partitions of the macroblock MB are predicted one after the other, but in a different order from that in which they were propagated in FIG. 4A.

More precisely, the prediction calculation module PRED of FIG. 2 traverses from left to right a first row of the macroblock MBpart represented in FIG. 4A which is intended to be assigned to the prediction of the initial partition P1. The first row chosen corresponds to the second row of the macroblock MBpart. The prediction calculation module PRED then predicts said partition P1 with reference to the pixels of the reference partition PR of a neighboring macroblock (not represented), which has just been coded, and then decoded, as explained previously. Although the reference pixels of the reference partition PR are not immediately in proximity to the pixels to be predicted, as was the case in the example of FIG. 5A, these reference pixels are nevertheless sufficiently so for the prediction distance to be correctly minimized. The prediction calculation module PRED delivers a first predicted partition which is immediately coded by the transform and quantization module MTQ, and then decoded by the module by the inverse transform and quantization module MTQI. On completion of these operations, a reference partition PR1 is obtained, as represented in FIG. 5B.

The prediction calculation module PRED thereafter traverses from left to right a second row of the macroblock MBpart which is intended to be assigned to the prediction of the second partition P2. The second row chosen is the first row of the macroblock MBpart. The prediction calculation module PRED predicts said partition P2 with reference to the pixels of the partition PR1 which has just been coded, and then decoded, as explained above, but also with reference to the pixels of said reference partition PR.

The prediction calculation module PRED delivers a second predicted partition which is immediately coded by the transform and quantization module MTQ, and then decoded by the inverse transform and quantization module MTQI. On completion of these operations, a reference partition PR2 is obtained, as represented in FIG. 5B.

The prediction of the partition P2 is thus much more accurate than in the example of FIG. 5A, since the partition P2 is predicted with reference to two reference partitions immediately neighboring it, instead of being predicted with reference to a single reference partition.

The prediction calculation module PRED proceeds in the manner described above, performing the prediction of the partitions P3, P4, P5, P6, P7 and P8, respectively on the fourth, third, sixth, fifth, eighth and seventh rows of the macroblock MBpart of FIG. 4A. On completion of this prediction and with reference to FIG. 5B, a predicted macroblock MBpred is obtained, the predicted partitions PR2, PR1, ... Pi+1, Pi, ..., PR8, PR7 following one another in the predicted macroblock MBpred, in a different order from the order of propagation of the partitions P1 to P8.

The choice of the order of traversal which has just been described in conjunction with a partitioning of linear type makes it possible to obtain a gain of about 4% in the throughput with respect to the gains obtained in conventional Intra codings.

With reference now to FIG. 5C, the partitions of the macroblock MBpart are predicted one after the other, again in a different order from that in which they were propagated in FIG. 4A. The order of traversal described in FIG. 5C is of dichotomic type.

More precisely, the prediction calculation module PRED of FIG. 2 traverses from left to right a first row of the macroblock MBpart represented in FIG. 4A which is intended to be assigned to the prediction of the initial partition P1. The first row chosen corresponds to the last row of the macroblock MBpart. The prediction calculation module PRED then predicts said partition P1 with reference to the pixels of the reference partition PR of a neighboring macroblock (not represented), which has just been coded, and then decoded, as explained previously. The prediction calculation module PRED delivers a first predicted partition which is immediately coded by the transform and quantization module MTQ, and then decoded by the inverse transform and quantization module MTQI. On completion of these operations, a reference partition PR1 is obtained, as represented in FIG. 5C.

The prediction calculation module PRED thereafter traverses from left to right a second row of the macroblock MBpart which is intended to be assigned to the prediction of the second partition P2. The second row chosen is the fourth row of the macroblock MBpart. The prediction calculation module PRED predicts said partition P2 with reference to the pixels of the partition PR1 which has just been coded, and then decoded, as explained above, but also with reference to the pixels of said reference partition PR.

The prediction calculation module PRED delivers a second predicted partition which is immediately coded by the transform and quantization module MTQ, and then decoded by the inverse transform and quantization module MTQI. On completion of these operations, a reference partition PR2 is obtained, as represented in FIG. 5C.

The prediction of the partition P2, although performed with reference pixels that are substantially distant from it, is however much more accurate than in the example of FIG. 5A, since the partition P2 is predicted with reference to two reference partitions, instead of being predicted with reference to a single reference partition.

The prediction calculation module PRED thereafter traverses from left to right a third row of the macroblock MBpart which is intended to be assigned to the prediction of the third partition P3. The third row chosen is the second row of the macroblock MBpart. The prediction calculation module PRED predicts said partition P3 with reference to the pixels of the partition PR2 which has just been coded, and then decoded, as explained above, but also with reference to the pixels of said reference partition PR.

The prediction calculation module PRED delivers a third predicted partition which is immediately coded by the transform and quantization module MTQ, and then decoded by the inverse transform and quantization module MTQI. On completion of these operations, a reference partition PR3 is obtained, as represented in FIG. 5C.

The prediction calculation module PRED thereafter traverses from left to right a fourth row of the macroblock MBpart which is intended to be assigned to the prediction of the fourth partition P4. The fourth row chosen is the sixth row of the macroblock MBpart. The prediction calculation module PRED predicts said partition P4 with reference to the pixels of the reference partitions closest to it, namely the pixels of the partition PR1 and the pixels of the partition PR2.

The prediction calculation module PRED delivers a fourth predicted partition which is immediately coded by the transform and quantization module MTQ, and then decoded by the inverse transform and quantization module MTQI. On completion of these operations, a reference partition PR4 is obtained, as represented in FIG. 5C.

The prediction calculation module PRED thereafter traverses from left to right a fifth row of the macroblock MBpart which is intended to be assigned to the prediction of the fifth partition P5. The fifth row chosen is the first row of the macroblock MBpart. The prediction calculation module PRED predicts said partition P5 with reference to the pixels of the reference partitions closest to it, namely the pixels of the partition PR and the pixels of the partition PR3.

The prediction calculation module PRED delivers a fifth predicted partition which is immediately coded by the transform and quantization module MTQ, and then decoded by the inverse transform and quantization module MTQI. On completion of these operations, a reference partition PR5 is obtained, as represented in FIG. 5C.

The prediction calculation module PRED thereafter traverses from left to right a sixth row of the macroblock MBpart which is intended to be assigned to the prediction of the sixth partition P6. The sixth row chosen is the third row of the macroblock MBpart. The prediction calculation module PRED predicts said partition P6:
  with reference to the pixels of the reference partitions closest to it, namely the pixels of the partitions PR2 and PR3,
  but also with reference to the pixels of the reference partitions more distant from it and shifted with respect to it by an identical number of partitions, namely the pixels of the partitions PR and PR4.

The prediction calculation module PRED delivers a sixth predicted partition which is immediately coded by the transform and quantization module MTQ, and then decoded by the inverse transform and quantization module MTQI. On completion of these operations, a reference partition PR6 is obtained, as represented in FIG. 5C.

The prediction calculation module PRED thereafter traverses from left to right a seventh row of the macroblock MBpart which is intended to be assigned to the prediction of the seventh partition P7. The seventh row chosen is the fifth row of the macroblock MBpart. The prediction calculation module PRED predicts said partition P7:
  with reference to the pixels of the reference partitions closest to it, namely the pixels of the partitions PR2 and PR4,
  but also with reference to the pixels of the reference partitions more distant from it and shifted with respect to it by a number of identical partitions, namely the pixels of the partitions PR1 and PR5.

The prediction calculation module PRED delivers a seventh predicted partition which is immediately coded by the transform and quantization module MTQ, and then decoded by the inverse transform and quantization module MTQI. On completion of these operations, a reference partition PR7 is obtained, as represented in FIG. 5C.

The prediction calculation module PRED thereafter traverses from left to right an eighth row of the macroblock MBpart which is intended to be assigned to the prediction of the eighth partition P8. The eighth row chosen is the seventh row of the macroblock MBpart. The prediction calculation module PRED predicts said partition P8 with reference to the pixels of the reference partitions closest to it, namely the pixels of the partitions PR1 and PR4.

The prediction calculation module PRED delivers an eighth predicted partition which is immediately coded by the transform and quantization module MTQ, and then decoded by the inverse transform and quantization module MTQI. On completion of these operations, a reference partition PR8 is obtained, as represented in FIG. 5C.

In accordance with the order of traversal represented in FIG. 5C, although the prediction of certain partitions is performed with reference pixels substantially distant from them, the accuracy of the prediction of the macroblock MBpart in its entirety remains high, having regard to the fact that some partitions are predicted with reference to two reference partitions and that some other partitions may be predicted with reference to four reference partitions.

On completion of this prediction and with reference to FIG. 5C, a predicted macroblock MBpred is obtained, the predicted partitions PR5, PR3, . . . , PR2, . . . , PR8, PR1 following one another in the predicted macroblock MBpred, according to a different dichotomic order from the order of propagation of the partitions P1 to P8.

The choice of the order of traversal which has just been described in conjunction with a partitioning of linear type makes it possible to obtain a gain of about 3% in the throughput with respect to the gains obtained in conventional Intra codings.

The third order of traversal of the partitions which has just been described is particularly appropriate for the prediction of a macroblock MBpart of non-uniform texture, this being the case when the image IE contains numerous details, or variations in luminance on patterns resembling the partition. It has been observed in particular that by selecting an "L"-shaped initial partition P1 as represented in FIG. 3C, the cost of the coding used in terms of throughput and distortion was substantially reduced.

Figure 6:
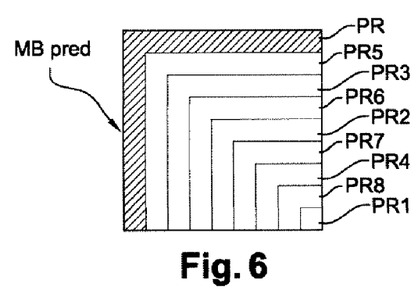
FIG. 6 represents the partitioned macroblock of FIG. 4C, which has been predicted according to one of the three orders of traversal represented in FIG. 5.

A predicted macroblock MBPred which has been predicted according to this third order of traversal, on the basis of the propagation of an "L"-shaped initial partition P1, is represented in FIG. 6.

The cost in terms of throughput and distortion is admittedly high when obtaining the first predicted partition PR1 which is very distant from the reference partition PR. However, this first prediction is performed on a single pixel which presents the advantage of being able to serve for the prediction of the pixels of the other partitions of the macroblock MBpart of FIG. 4C. Ultimately, the prediction of the macroblock MBpart in its entirety is of a greater accuracy than in the case of a conventional prediction by blocks or than in the case of the other above-described orders of traversal of partitions.

Once the possible predictions have been calculated by the prediction calculation module PRED, in the course of a step C5 represented in FIG. 1, a decision module DCN, represented in FIG. 2, traverses the partitioned macroblocks of the image IE and chooses, in this step C5, the prediction mode used to code each of these macroblocks. From among the possible predictions for a macroblock, the decision module DCN chooses the optimal prediction according to a distortion throughput criterion well known to the person skilled in the art.

For a current macroblock MB to be coded, the decision module DCN places for example in competition:
 the three partition traversal orders represented in FIG. 5, the current macroblock MB having been partitioned for example as represented in FIG. 4A,
 and the conventional prediction mode, the current macroblock MB having been partitioned according to blocks of square form, of size 8×8.

According to another variant, the decision module DC places for example in competition:
 the two partition traversal orders O1, O2 represented respectively in FIGS. 5A and 5B, the current macroblock MB having been partitioned for example as represented in FIG. 4A,
 the dichotomic traversal order O3 represented in FIG. 6, the current macroblock MB having been partitioned for example as represented in FIG. 4C,
 and the conventional prediction mode, the current macroblock MB having been partitioned according to blocks of square form, of size 8×8.

Each predicted macroblock MBpred is coded, in the course of a step C6, as in the H.264/MPEG-4 AVC standard. More precisely with reference to FIG. 7, where a slice T of coded macroblock of the image IE is represented, each coded macroblock comprises a field CH1 specifying the type of coding of the macroblock MB considered, Intra in the case of the embodiment represented, a field CH2 indicating the form of the selected partition (square, row, column, cross, "L", etc. . . . ), a field CH3 indicating the prediction mode used (conventional prediction mode or orders of traversal O1, O2 or O3 such as described above), and a field CH4 coding the values of the residuals of the predicted macroblock MBpred.

Figure 8:
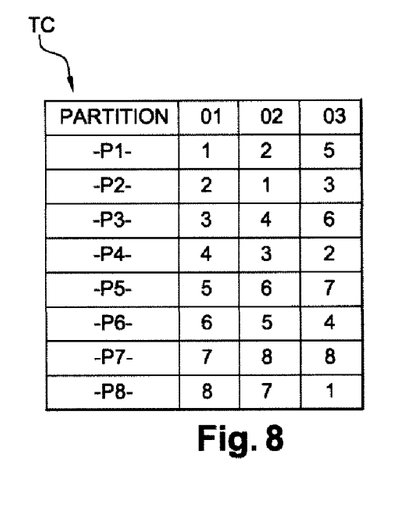
FIG. 8 represents the detail of a field which makes up the structure of the coded macroblock of FIG. 7.

As may be seen in FIG. 8, the information coded in the field CH3 is contained previously in a database BD2 of the coder CO represented in FIG. 2.

Again with reference to FIG. 8, such correspondence information is stored in a correspondence table TC with four columns. The first column comprises a "partition" field which lists all the partitions of a macroblock MBpart, in the order in which they were propagated. The second to fourth columns each comprise an "order of traversal" field O1, O2, O3 which assigns to each propagated partition a specific traversal order number for its prediction, as was described above.

Once this structural coding has been performed by the decision module DCN, the coefficients of residuals if they exist, corresponding to the blocks of the image IE, are dispatched to the transform and quantization module MTQ, so as to undergo discrete cosine transforms followed by a quantization. The slices of macroblocks with these quantized coefficients are thereafter transmitted to the entropy coding module CE, so as to produce, with the other images of the video sequence that have already been coded in the same manner as the image IE, a binary video stream F coded according to the invention.

The binary stream F thus coded is transmitted by a communication network to a remote terminal. The latter comprises a decoder DEC according to the invention, represented in FIG. 9.

The binary stream F is firstly dispatched to an entropy decoding module DE, which decoding is inverse to that performed by the entropy coding module CE represented in FIG. 2. Next, for each image macroblock to be reconstructed, the coefficients decoded by the module DE are dispatched to an inverse quantization and inverse transform module QTI.

Figure 10:
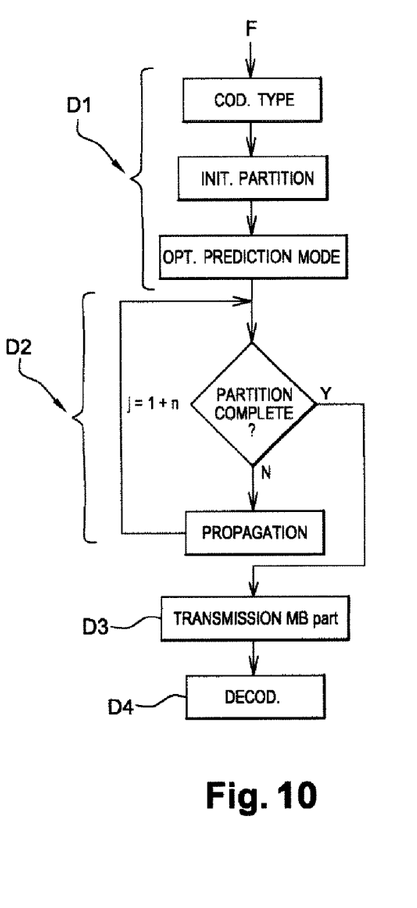
FIG. 10 represents steps of the decoding method according to the invention.

An image reconstruction module RI then receives decoded data corresponding to the data produced by the module DCN (FIG. 2) in step C5 of coding according to the invention, to within transmission errors. The module RI implements steps D1 to D4 of the decoding method according to the invention, such as represented in FIG. 10.

The first step D1 is the decoding of data structures coded in a slice T of a current macroblock of the image IE to be decoded. In a manner known per se, the reconstruction module RI determines in the field CH1 (FIG. 7) that the data of the slice T have undergone a coding of Intra type.

In the course of this same step, the reconstruction module RI determines, in accordance with the decoding method according to the invention:
 the form of the initial partition P1 to be reconstructed, by virtue of the field CH2 (FIG. 7),
 the optimal prediction mode selected by the decision module DCN (FIG. 2), by virtue of the field CH3.

If, for example, the initial partition P1 has the form of an "L" as represented in FIG. 4C and the optimal prediction mode is the order of traversal O3 represented in FIG. 5C, the reconstruction module RI deduces therefrom the order in which the various partitions P1 to P8 of the current macroblock will be decoded. Such a deduction is performed by means of the table TC represented in FIG. 8 and stored in the decoder DEC.

The next step D2 represented in FIG. 10 is the partitioning of the current macroblock to be decoded, according to the initial partition P1 determined in step D1. This partitioning is performed by a module PMB for partitioning macroblocks which in every respect resembles that represented in FIG. 2.

For this purpose, with reference to FIG. 10, the partitioning module PMB comprises:
- a splitting sub-module PART intended to split a first time the current macroblock to be decoded according to the initial partition P1 determined,
- a propagation sub-module PROP intended to propagate said determined initial partition P1 a number n of times (n being an integer) in the macroblock MB, until the latter is split in its entirety into a number n+1 of partitions of predetermined form.

The propagation module PMB uses a propagation algorithm of the type of that described previously.

Figure 9:
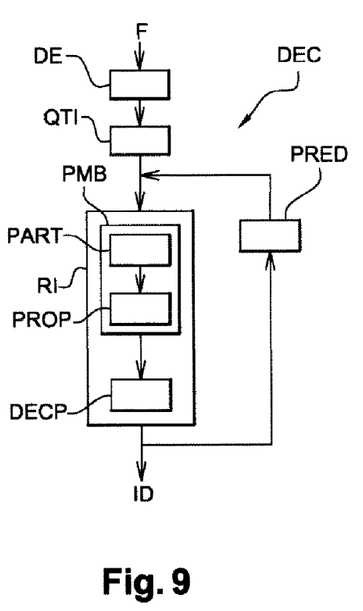
FIG. 9 represents a decoding device according to the invention.

Following the partitioning step D2, in the course of a step D3 represented in FIG. 10, the partitioning module PMB transmits the current macroblock to be decoded, and which has just been partitioned into n+1 partitions, to a partitions decoding module DECP represented in FIG. 9.

In the course of a step D4 represented in FIG. 10, the module DECP then performs a decoding of the n+1 partitions according to the decoding order determined in step D1.

For this purpose, for each partition to be decoded of a current macroblock to be decoded, the decoding module DECP uses prediction values of the immediately previous partition which are provided by the prediction calculation module PRED, represented in FIG. 9.

The prediction calculation module PRED in fact receives the values of the partitions previously decoded by the reconstruction module RI, which values it keeps in memory.

Figure 7:
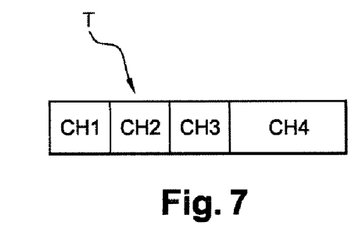
FIG. 7 represents the structure of a macroblock coded by the coding device according to the invention.

The n+1 partitions of a macroblock of the image IE are decoded using the Intra spatial prediction indicated in the field CH1 represented in FIG. 7.

Once all the macroblocks of the image IE have been decoded, the image reconstruction module RI provides as output from the decoder DEC an image ID corresponding to the decoding of the image IE.

The invention claimed is:

1. A method for coding an image or a sequence of images generating a data stream comprising data representative of at least one group of pixels in one of said images, said method comprising the steps of:
    selecting, for a group of pixels to be coded, an initial partition in a predetermined set of partitions of predetermined linear form one pixel wide and a plurality of pixels long,
    splitting partially said group of pixels to be coded according to said selected initial partition,
    predicting said initial partition with respect to at least one reference partition, said reference partition being a partition coded previously to said group of pixels to be coded,
    propagating said initial partition selected in rest of said group of pixels to be coded, until said group is split in its entirety into a plurality of partitions, the rest of said group of pixels being split into a plurality of further partitions whose respective form is adapted in order that the partitions do not overlap in the rest of said group of pixels,
    traversing said further partitions in a plurality of orders and predicting said further partitions one after the other and thereby generating a plurality of predictions in accordance with respective ones of said plurality of orders of traversal of said partitions, wherein the prediction of a current further partition in said group of pixels to be coded is performed with respect to at least one reference partition, said reference partition being a partition within said group of pixels to be coded which was predicted previously to the current partition and having already been coded, and then decoded, and wherein, in at least one of said plurality of orders of traversal, at least one partition does not immediately neighbor its respective said reference partition,
    selecting, from among said plurality of orders of traversal an order of traversal which optimizes the prediction,
    coding said predicted group of pixels according to said selected order of traversal.

2. The coding method as claimed in claim 1, wherein the predetermined linear form is not a straight line.

3. The coding method as claimed in claim 1, wherein at least some of the partitions are not rectangular partitions one pixel wide.

4. The coding method as claimed in claim 1 further comprising, in at least one of said plurality of orders of traversal, predicting and coding at least one current further partition with respect to two said reference partitions on different sides of said current further partition.

5. The coding method as claimed in claim 1, wherein the selected order of traversal of the partitions is the same as the order in which they were propagated.

6. The coding method as claimed in claim 4, wherein in said at least one order of traversal of the partitions said predicting and coding with respect to two said reference partitions on different sides of said current further partition comprises the predicting and coding of said at least one current further partition with respect to two reference partitions which immediately neighbor it.

7. The coding method as claimed in claim 1, wherein the selected order of traversal of the partitions is of dichotomic type.

8. The coding method as claimed in claim 1, wherein the data stream comprises information relating to the form of said selected partition and to the order of traversal which was selected.

9. A method for decoding a data stream representative of an image or of a sequence of images, said stream comprising data representative of at least one group of pixels in one of said images, comprising the steps of:
    determining, in said stream to be decoded, an initial partition in a predetermined set of partitions of predetermined linear form one pixel wide and a plurality of pixels long,
    splitting partially said group of pixels to be decoded according to said determined initial partition,
    propagating said initial partition determined in said rest of group of pixels to be decoded, until said group is split in its entirety into a plurality of partitions, the rest of said group of pixels being split into a plurality of further partitions whose the respective form is adapted in order that the partitions do not overlap in the rest of said group of pixels,
    determining, in said stream to be decoded, an order of traversal of said partitions which has been selected at the coding, from among a plurality of orders of traversal, as optimizing the prediction of the partitions, wherein the decoding of said initial partition in said group of pixels is performed with respect to at least one reference partition, said reference partition being a partition coded previously to said group of pixels to be coded, and the decoding of a current further partition in said group of pixels is performed with respect to at least one reference partition, said reference partition being a partition within said group of pixels to be decoded which was predicted previously to the current partition and having already been coded, and then decoded, wherein at least one of one current partition does not immediately neighbor its respective said reference partition, and decoding said partitions one after the other, according to said determined one of said plurality of orders of traversal.

10. The decoding method as claimed in claim 9, wherein the predetermined linear form is not a straight line.

11. The coding method as claimed in claim 9, wherein at least some of the partitions are not rectangular partitions one pixel wide.

12. The coding method as claimed in claim 9 wherein the order of traversal of the partitions allows the decoding of at least one current partition with respect to two reference partitions on different sides of said current further partition.

13. The decoding method as claimed in claim 9, wherein the order of traversal of the partitions is the same as the order in which they were propagated.

14. The decoding method as claimed in claim 12, wherein said two reference partitions immediately neighbor said at least one current further partition.

15. The decoding method as claimed in claim 9, wherein the order of traversal of the partitions is of dichotomic type.

16. An entropy coding device for producing a carrier signal bearing a data stream representative of an image or of a sequence of images, wherein the entropy coding device comprises a partitions selection module, a macroblock partitioning module, and a prediction calculation module, and the modules are implemented in a computer hardware, said stream comprising data representative of at least one group of pixels in one of said images, wherein:

some of said representative data relate to a predetermined linear form one pixel wide and a plurality of pixels long of an initial partition which was selected by the partitions selection module in a predetermined set of partitions at the moment of the prediction and coding of said group of pixels, and some others of said representative data relate to an order of traversal of the partitions forming said group of pixels and resulting from the propagation of said selected initial partition by the macroblock partitioning module, with a view to the prediction and coding of said partitions by the prediction calculation module, said order of traversal has been selected at the coding, from among a plurality of orders of traversal, as optimizing the prediction of the partitions, wherein the prediction of said initial partition in said group of pixels is performed with respect to at least one reference partition, said reference partition being a partition coded previously to said group of pixels to be coded, and the prediction of a current further partition in said group of pixels is performed with respect to at least one reference partition, said reference partition being a partition within said group of pixels which was predicted previously to the current partition and having already been coded, and then decoded and wherein, in at least one of said plurality of orders of traversal, at least one partition does not immediately neighbor its respective said reference partition.

17. A device for coding an image or a sequence of images generating a data stream comprising data representative of at least one group of pixels in one of said images, said device comprising means for:

selecting, for a group of pixels to be coded, an initial partition in a predetermined set of partitions of predetermined linear form one pixel wide and a plurality of pixels long, splitting partially said group of pixels to be coded according to said selected initial partition, predicting said initial partition with respect to at least one reference partition, said reference partition being a partition coded previously to said group of pixels to be coded, propagating said initial partition in rest of said group of pixels to be coded, until said group is split in its entirety into a plurality of partitions, the rest of said group of pixels being split into a plurality of further partitions whose respective form is adapted in order that the partitions do not overlap in the rest of said group of pixels, traversing said further partitions in a plurality of orders and predicting said further partitions one after the other and thereby generating a plurality of predictions in accordance with respective ones of said plurality of orders of traversal of said partitions, wherein the prediction of a current further partition in said group of pixels is performed with respect to at least one reference partition, said reference partition being a partition within said group of pixels to be coded which was predicted previously to the current partition and having already been coded, and then decoded, and wherein, in at least one of said plurality of orders of traversal, at least one partition does not immediately neighbor its respective said reference partition, selecting, from among said plurality of orders of traversal, an order of traversal which optimizes the prediction, and coding predicted group of pixels, according to said selected order of traversal.

18. A device for decoding a data stream representative of an image or of a sequence of images, said stream comprising data representative of at least one group of pixels in one of said images, said device comprising means for:

determining, in said stream to be decoded, an initial partition in a predetermined set of partitions of predetermined linear form one pixel wide and a plurality of pixels long, splitting partially said group of pixels to be decoded according to said determined initial partition, propagating said initial partition determined in rest of said group of pixels to be decoded, until said group is split in its entirety into a plurality of partitions, the rest of said group of pixels being split into a plurality of partitions whose the respective form is adapted in order that the partitions do not overlap in the rest of said group of pixels, determining, in said stream to be decoded, an order of traversal of said partitions which has been selected at the coding, from among a plurality of orders of traversal, as optimizing the prediction of the partitions, wherein the decoding of said initial partition in said group of pixels is performed with respect to at least one reference partition, said reference partition being a partition coded previously to said group of pixels to be coded, and the decoding of a current further partition in said group of pixels is performed with respect to at least one reference partition, said reference partition being a partition within said group of pixels to be decoded which was predicted previously to the current partition and having already been coded, and then decoded, wherein at least one partition does not immediately neighbor its respective said reference partition, and decoding said partitions one after the other, according to said determined one of said plurality of orders of traversal.

19. An article of manufacture including non-transitory computer readable media with instructions encoded and stored thereon, the stored instructions, when executed causes a processor to perform the steps of:
- determining, in said stream to be decoded, an initial partition in a predetermined set of partitions of predetermined linear form one pixel wide and a plurality of pixels long,
- splitting partially said group of pixels to be decoded according to said determined initial partition,
- propagating said initial partition determined in said rest of group of pixels to be decoded, until said group is split in its entirety into a plurality of partitions, the rest of said group of pixels being split into a plurality of further partitions whose the respective form is adapted in order that the partitions do not overlap in the rest of said group of pixels,
- determining, in said stream to be decoded, an order of traversal of said partitions which has been selected at the coding, from among a plurality of orders of traversal, as optimizing the prediction of the partitions, wherein the decoding of said initial partition in said group of pixels is performed with respect to at least one reference partition, said reference partition being a partition coded previously to said group of pixels to be coded, and the decoding of a current further partition in said group of pixels is performed with respect to at least one reference partition, said reference partition being a partition within said group of pixels to be decoded which was predicted previously to the current partition and having already been coded, and then decoded, wherein at least one partition does not immediately neighbor its respective said reference partition, and
- decoding said partitions one after the other, according to said determined one of said plurality of orders of traversal.

* * * * *